United States Patent [19]

Scholz et al.

[11] 4,145,800

[45] Mar. 27, 1979

[54] METHOD OF REPAIRING COATED WORKPIECES

[75] Inventors: Manfred Scholz, Hurth-Hermulheim; Lothar Strie, Bornheim-Merten, both of Fed. Rep. of Germany

[73] Assignee: Hoechst Aktiengesellschaft, Frankfurt am Main, Fed. Rep. of Germany

[21] Appl. No.: 898,384

[22] Filed: Apr. 20, 1978

[30] Foreign Application Priority Data

Apr. 23, 1977 [DE] Fed. Rep. of Germany ........ 2718144

[51] Int. Cl.² .............................................. B23P 7/00
[52] U.S. Cl. ................................. 29/401 E; 85/1 JP; 220/327; 220/378; 220/213
[58] Field of Search ............. 29/401 E; 220/235, 236, 220/327, 328, 378, 234, 287, 213, 233, 295, 308; 85/1 JP

[56] References Cited

U.S. PATENT DOCUMENTS

| 2,167,597 | 7/1939 | Webb | 220/213 X |
| 2,470,800 | 5/1949 | Ashton | 85/1 JP |
| 2,744,591 | 5/1956 | Simpson | 85/1 JP |

FOREIGN PATENT DOCUMENTS

| 1115147 | 10/1961 | Fed. Rep. of Germany | 220/235 |
| 170561 | 8/1952 | Sweden | 220/235 |

Primary Examiner—Leon Gilden
Assistant Examiner—V. K. Rising
Attorney, Agent, or Firm—Connolly and Hutz

[57] ABSTRACT

Defective sites in the interior enamel coating of an enameled container are repaired. To this end, a bore is provided in the defective site; a sleeve is inserted in the bore; a screw bolt with two threaded ends is passed through the sleeve; a seal is slipped over the threaded end portion of the screw bolt which reaches into the container; a cap nut is tightened thereonto; a cup spring and lock nut are slipped over the threaded end portion of the screw bolt which extends outwardly from the container; and the cup spring and lock nut are tightened by means of a cap nut.

4 Claims, 1 Drawing Figure

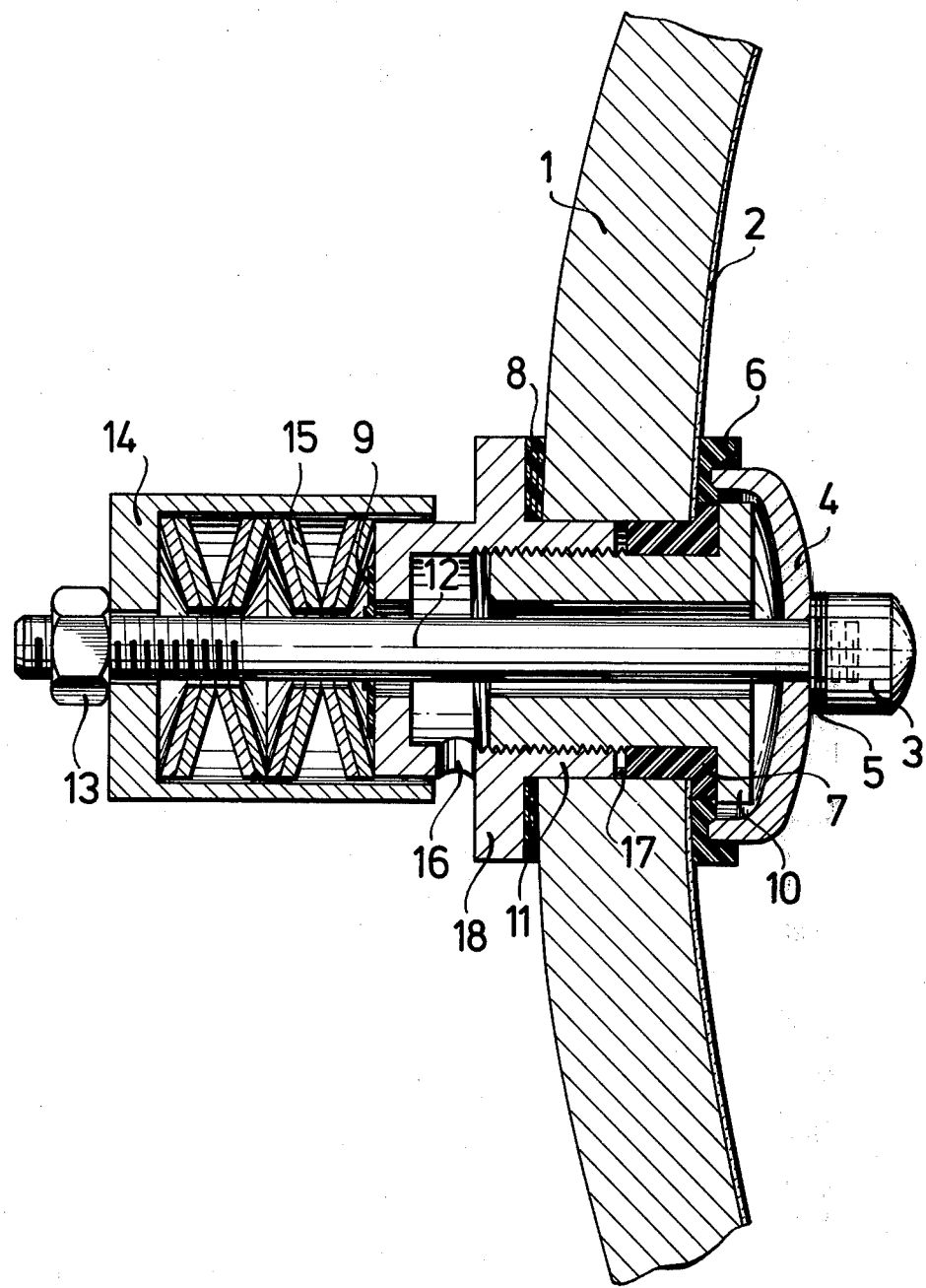

METHOD OF REPAIRING COATED WORKPIECES

This invention provides a method of repairing a defective coated workpiece, especially an enameled container.

Expensive materials are normally required to be used in industry in all those cases in which corrosive substances are handled. In order to enable effective use to be made of the good properties of steel in the treatment of corrosive substances, it has been an customary procedure to apply an enamel, plastics or corrosion resistant metal coating to the steel surface area so as to protect it against corrosion.

One of the disadvantages which are encountered in connection with the protection against corrosion just described resides in the fact that especially an enamel coating is highly susceptible to the action of shearing stresses. Under the action of even minor impact stress or pressure shock an enamel coating tends to stress cracking. In the end, the defective area is found to chip off leaving an unprotected steel surface open to corrosion.

It is generally accepted that defects, which are detectable not earlier than during the use of a coated workpiece, occur as early as during the coating operation. It is more particularly known that pores tend to be formed in a baked enamel coating where the base metal presents microscopically small defects. These are pores which cannot reliably be determined neither by X-ray nor ultrasonic investigation. This is the reason why various methods of repairing defective areas of coated workpieces have been tried in industry.

In one of these prior methods, the defective area is cleaned and subsequently repaired by means of a hardening plastics emulsion or a hardening cement composition. While this operation is easy to carry out, which is desirable, the fact remains that a steel surface cannot reliably be protected against corrosion by means of plastics materials which are commonly less resistant to chemicals than steel and of which the strength compares unfavorably with that of steel.

Another method which is used for the repair of large-surfaced defective areas provides for the workpiece to be re-enameled. Needless to say it is necessary to have the entire workpiece re-enameled as it is technically not possible to re-enamel just the defective area. In other words, it is necessary to transport the defective workpiece to a metal enamel facility and have it re-enameled by a method which incidentally does not always ensure that the re-enameled workpiece is actually free from pores. If no suitable reserve workpiece is available, it is necessary to stop production facilities during the repair period.

In another known method use is made of a sealing cap of resistant material which is placed upon the defective area. To this end, a thread is carved in the base material and a screw bolt is secured therein. In the event of the defective area being relatively small, a cap nut is screwed on to the screw bolt together with a packing ring of plastics material sealing off the cap nut from the unimpaired coating of the workpiece. In the event of the defective area being relatively large, use is made of a sealing bell which is forced against the unimpaired coating of the workpiece by means of a capnut. Once again, a packing ring or gasket of plastics material is used to seal off the sealing bell from the coated workpiece, the cap nut being provided with a cutting edge sealing it off from the sealing bell. The hollow interior of the sealing bell is filled with a cementing composition.

This latter method enables a workpiece to be repaired without the need to dismantle it, but it does not permit the sealing cap to be controlled for leakiness, i.e. it is not possible to determine whether or not the sealing cap is tightly connected to the coated side of the workpiece. If the sealing cap is not in close tight contact with the workpiece, or if it becomes defective, the base material of the workpiece is liable to undergo corrosion. As a result, the surface of the defective area becomes enlarged and, in the end, the sealing cap is no longer reliably held in position. In other words, a larger-surfaced defective area has then to be repaired and sealed. Needless to say the difficulties encountered in sealing a defective area increase with an increasing surface of the defective area. In the event of a defective area repaired once undergoing further corrosion, its surface is liable to become so large that it may be necessary to re-enamel the whole workpiece.

It is therefore an object of the present invention to provide a method of repairing workpieces which permits the base material to be reliably protected against corrosion even in the event of the sealing cap becoming defective, and which permit the sealing cap to be controlled for leakiness from the outside.

The present invention relates more particularly to a method of repairing defective sites in the interior enamel coating of an enameled container, which comprises: providing a bore in the defective site; inserting a sleeve in the bore; passing a screw bolt with two threaded ends through the sleeve; slipping a seal over the threaded end portion of the screw which reaches into the container; tightening a cap nut thereonto; slipping a cup spring and lock nut over the threaded end portion of the screw bolt which extends outwardly from the container; and tightening the cup spring and lock nut by means of a cap nut.

Further features of the present invention provide:
(a) for the sleeve to comprise a two-piece sleeve provided with a control bore and a packing sealing it off from the lock nut;
(b) for the cap nut to be welded to the sealing cap;
(c) for the seal to be made up of chemically resistant material, preferably of elastic plastics material, more preferably of polyfluoroethylene;
(d) for the seal placed between the container and the sleeve to comprise a collar sleeve;
(e) for the sealing sleeve to be formed with a collar of polyfluoroethylene reinforced by means of glass fibers, and
(f) for the seal of the cap nut to be formed as a cutting edge.

One of the advantages which are associated with the present invention resides in the fact that the repaired area can be inspected for tightness or leakiness through the control bore or, in the event of a jacket container, by means of a compensator and the threaded sleeve.

The invention will now be described with reference to the accompanying drawing:

A defective area 2 of a workpiece 1 is provided with a bore 17 which receives a packing 8 and a threaded sleeve 11. Next a further threaded sleeve 10 and a packing 7 are passed through the bore 17 and screw-connected to the threaded sleeve 11.

The threaded sleeves 10 and 11 are screwed together so as to force the seals or packings 7 and 8 and the flange packing 18 of the threaded sleeve 11 into contact with the workpiece 1 and seal it. Passed through the sleeve so made is screw bolt 12 over which are slipped in the following sequential order a packing 6, a sealing cap 4 and a packing 5 which are all tightened thereto by means of a cap nut 3. Slipped over the free end of the screw bolt 12 are packing 9, a set of cup springs 15 and a lock nut 14. The structural parts slipped over the screw bolt 12 are held in position by means of a screw nut 13. The control bore 16 provided in the threaded sleeve 11 permits the sealing cap to be inspected for tightness.

We claim:

1. A method of repairing defective sites in the interior enamel coating of an enameled container which comprises: providing a bore in the defective site; inserting a sleeve in the bore; passing a screw bolt with two threaded ends through the sleeve; slipping a seal over the threaded end portion of the screw bolt which reaches into the container; tightening a cap nut thereonto; slipping a cup spring and a lock nut over the threaded end portion of the screw bolt which extends outwardly from the container; and tightening the cup spring and lock nut by means of a cap nut.

2. The method as claimed in claim 1, wherein a two-piece sleeve is inserted in the bore.

3. The method as claimed in claim 1, wherein the sleeve has a control bore.

4. The method as claimed in claim 1, wherein the lock nut is sealed off by means of a packing.

* * * * *